(12) United States Patent
Goodfellow

(10) Patent No.: US 6,275,879 B1
(45) Date of Patent: Aug. 14, 2001

(54) ATA COMPATIBLE ADAPTER HAVING A SHADOW REGISTER CONFIGURED TO INTERCEPT DEVICE SELECT INFORMATION AND AN AUTOMATIC INTERRUPT POLLING FOR OVERLAPPED ATA COMMANDS

(76) Inventor: Tony Goodfellow, 6662 Gatehill Cir., Huntington Beach, CA (US) 92648-2109

( * ) Notice: Subject to any disclaimer, the term of this patent is extended or adjusted under 35 U.S.C. 154(b) by 0 days.

(21) Appl. No.: 09/070,329

(22) Filed: Apr. 30, 1998

(51) Int. Cl.[7] .............................. G06F 13/10; G06F 13/22
(52) U.S. Cl. ............................. 710/74; 710/10; 710/46; 710/47; 710/72
(58) Field of Search ....................... 710/3, 5, 18, 46–48, 710/74, 8, 10, 62, 64, 72; 709/301

(56) References Cited

U.S. PATENT DOCUMENTS

| 5,463,752 | * | 10/1995 | Benhase et al. | 711/154 |
| 5,590,336 | * | 12/1996 | Parry | 710/220 |
| 5,765,040 | * | 6/1998 | Uno et al. | 710/46 |
| 5,802,398 | * | 9/1998 | Liu et al. | 710/62 |
| 5,905,885 | * | 5/1999 | Richter et al. | 395/500.44 |
| 5,920,709 | * | 7/1999 | Hartung et al. | 710/129 |
| 5,996,045 | * | 11/1999 | Lee et al. | 711/112 |

* cited by examiner

Primary Examiner—Thomas C. Lee
Assistant Examiner—Ilwoo Park
(74) Attorney, Agent, or Firm—Stradling Yocca Carlson & Rauth

(57) ABSTRACT

A method without the Host systems intervention to automatically select Devices on an ATA Cable and determine if they require to be serviced. Upon detection to the indicate to the Host that service is required. This method greatly reduces the Host system's processor overhead associated with Polling the Devices for status.

6 Claims, 1 Drawing Sheet

ATA COMPATIBLE ADAPTER HAVING A SHADOW REGISTER CONFIGURED TO INTERCEPT DEVICE SELECT INFORMATION AND AN AUTOMATIC INTERRUPT POLLING FOR OVERLAPPED ATA COMMANDS

FIELD OF THE INVENTION

The invention relates generally to the control of storage and other devices when connected to a computer system and, more particularly, to an ATA compatible adapter which automatically polls devices and which interrupts a host computer only when a device requires service.

BACKGROUND OF THE INVENTION

One of the most popular types of data storage devices used on computer systems of all types is termed an IDE or ATA device. The name derives from the interface standard used by the device in order to connect to a computer system. The ATA Standard is recognized on an industry-wide basis and is administered under the auspices of the American National Standards Institute (ANSI). By following the Standard, computer users can obtain devices from a variety of manufacturers with the assurance that they will interoperate.

The ATA Standard has enabled storage device manufacturers to produce low cost, high performance products. There are several elements in a computer system which are required in order for an ATA device to operate. These are the ATA devices themselves (Device), a host adapter (Adapter), a cable that couples them together (Cable) and the host computer software driver (Driver) that controls the Devices in the flow of data to and from them. The Adapter can be a separate item connected to or built into the host system (Host). Up to two Devices may be attached to one Cable. The data and control path provided by the Adapter, using the protocols defined in the ATA Standard is often referred to as a Channel. Thus one Channel may control up to two Devices. There is nothing to preclude an Adapter from supporting several Channels.

Although the ATA Standard allows the attachment of two Devices on one Channel, it is limited by its current ability to perform tasks with respect to only Device at a time. To overcome this limitation, the Standard is being changed to allow commands to be sent to both Devices and/or multiple commands to be sent to the same Device. This allows commands to be queued and executed in a more efficient manner by both Devices.

If a Device finishes a command and requires service from the Host, it can request service by changing the state of an Interrupt line on the Channel. The ATA interface is defined in such a way as to allow only the currently selected Device to cause an interrupt on the Channel. To overcome this, the host Driver has to alternately select (Poll) each Device to allow the Devices a chance to indicate that they want service.

In conventional computer systems, Polling is achieved by the Driver in the Host performing a sequence of input/output instructions to change the Device currently selected and read the status of the Device. This has to be alternately performed on each Device on a Channel. In multiple-channel situations, the Host has to select Devices on each Channel; one at a time. This software Polling can either consume a great deal of processor time or must rely on some other form of Host interrupt (e.g., a timer interrupt) to only Poll periodically. In the later case, if the timer, if the timer interrupt has a long period, the disk response latency is greatly increased; if it has a short period the processing overhead is increased. Using either software Polling methods results in excessive use of the Hosts resources and results in an overall and satisfactory system performance.

SUMMARY OF THE INVENTION

The present invention is directed to a data communication system comprising a host computer and at least one data storage device, configured to communicate with the host computer in accordance with an ATA protocol. The data storage device includes a register configured to hold device selection information received from the host computer. An ATA compatible cable is coupled to the at least one data storage device, the cable including a plurality of address lines. An ATA compatible adapter circuit is coupled to the cable and is disposed between the cable and the host computer. The Adapter circuit includes a shadow register which is configured to intercept device select information sent by the host computer. The adapter evaluates the contents of the shadow register and forwards the contents to a selected data storage device.

In another aspect of the invention, the adapter includes means for periodically polling the selected data storage device in order to receive an interrupt therefrom. The adapter forwards the interrupt to the host computer such that the data storage device is isolated from the host computer. Additionally, the adapter recognizes command information issued by the host computer and is further able to differentiate between command information directed to a data storage device and command information directed to the adapter.

In a further aspect of the invention, a second data storage device is coupled to the cable with the second data storage device including a register configured to hold device select information received from the host computer. The device select information is a binary value written into a bit position of each register. The binary value takes on a first value in order to select the first data storage device and a second value to select the second data storage device. The adapter alternately selects the first and second data storage devices for periodically polling each alternately selected data storage device in order to receive an interrupt therefrom. The adapter forwards the interrupt to the host computer such that each data storage device is polled without host computer intervention.

DESCRIPTION OF THE DRAWINGS

These and other features, aspects and advantages of the present invention will be more fully understood when considered in connection with the following specification, appended claims and accompanying drawings wherein:

DETAILED DESCRIPTION OF THE INVENTION

Figure 1:
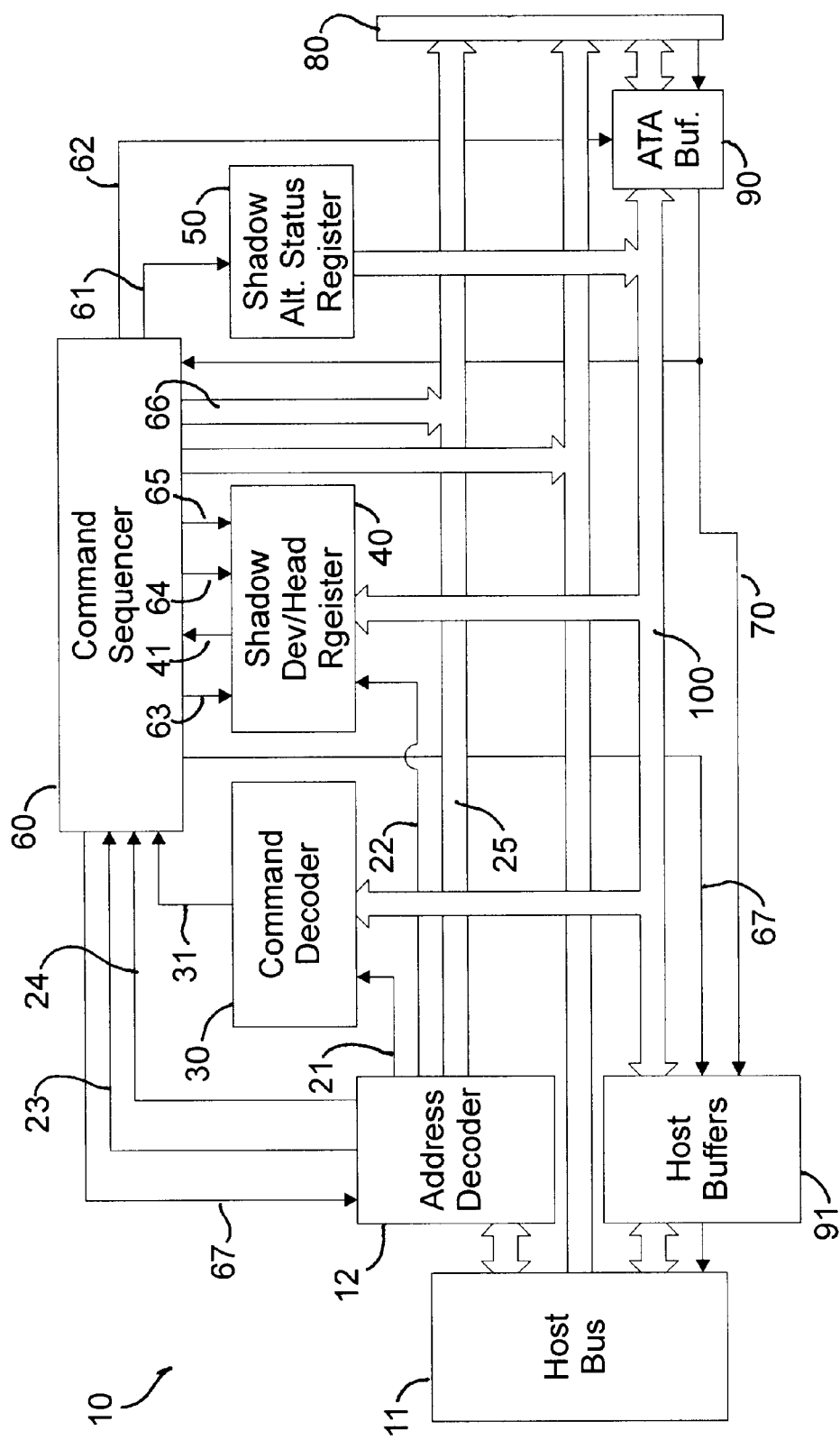
FIG. 1 is a simplified, semi-schematic block diagram of an ATA compatible adapter circuit in accordance with practice of principles of the present invention.

Conventional adapters perform the function of decoding an address sent by host driver software in order to pass on the address to a selected device, electrically buffering control and data signals and transmitting data to/from the device, from/to the host, or any other component designated by the driver. The adapter's function can be expanded to perform automatic polling (Auto Polling) of devices and to interrupt the host only when a device requires service. This eliminates processing overhead and ensures that the device receives service in a minimal period of time.

The following is an explanation of an exemplary embodiment of how this functionality might be provided. Since it is exemplary in nature, it is not meant to be limiting, but merely represent one particular method of implementation.

An adapter, in accordance with the invention, and indicated generally at 10, communicates two Devices through a set of registers residing in each Device. The adapter 10 addresses registers by using address lines 25 disposed on the channel. These address lines are common to both devices. There are no lines to select a device. Device selection is accomplished by evaluating the state of one bit (DEV) in the device/head register. By some form of hardware switch, cable position or jumper, a device is designated as either device 0 or device 1 termed its hardware address. By examining DEV and comparing it with the hardware address, a device can determine if the command is being sent to it or to the other device. Similarly, it is this mechanism which allows the device to determine if it is allowed to interrupt the adapter or not. Thus, in this particular embodiment of the invention, the adapter toggles DEV in order to alternately select each device.

As the device selection methodology involves one bit, disposed in a register, the state of the other bits may have to be preserved. One way of accomplishing this is for the adapter to provide a shadow device/head register 40 in its hardware. The adapter decodes the address of registers being requested by the driver and, when it recognizes an address request for the device/head register, it will copy the data being written to it into its shadow device/head register 40.

Auto Polling consists of a sequence of events undertaken by the adapter. The sequence commences by the adapter changing DEV in the shadow device/head register 40 and activating the appropriate address select lines. After an appropriate delay time which enables the device to recognize the address selection, the contents of the shadow device/head register 40 will be sent to the devices. The adapter will then wait the required time for a device to recognize the change to DEV and issue an interrupt. If an interrupt is not issued by the device, the adapter will toggle DEV in its shadow device/head register and will restart this sequence. The Auto Polling sequence is terminated by either a device's causing an interrupt or by the driver attempting to access or send a command to either device or directly to the adapter.

When an interrupt has occurred, the driver is able to determine which device is selected by reading the device/head register and examining DEV. The adapter is also able to be provided with a register, at a unique address, that would indicate which device had issued the interrupt by setting register bits, in turn readable by the driver.

Initialization of the polling sequence is accomplished by the driver writing to a command register in the adapter or, by the use of a unique ATA command sent to the channel. This unique ATA command is interpreted by the adapter and ignored by the device. In either case, the driver is able to determine whether the Auto Polling capability exists.

In the case of a unique register, two bit positions are provided in such a register, that the driver is able to write to and then read back from. The two bits would be transposed during a driver read, in order to indicate that the register is present and that the adapter is able to perform the functionality. Whichever method is chosen, it is only necessary that the driver be able to detect that the function is available and that it is not merely seeing random signals (noise) from a non-existent register.

If a unique ATA Command is provided, it should accordingly have no consequential impact on the state or operation of a device. The device should return a status that the driver is able to recognize, the status indicating that the polling service is not available. The sequence of events in this particular implementation might be as follows. The driver provides the unique command to the currently selected device. The adapter recognizes the command and also passes it to the device which will accordingly set it s status to show non-support of the feature. The driver reads the status set by the device and the adapter passes the read status information back to the device. The adapter reads status information from the device but does not pass this information back to the driver. The adapter passes good status back to the driver by which means the driver will have determined that the adapter supports Auto Polling. In this manner, a driver can determine whether the adapter can provide the auto polling service. The adapter is able to support auto polling, the driver will receive a "supported" response from the status read. If the adapter is unable to support auto polling, the driver receives the "not supported" status from the device.

In the exemplary embodiment of FIG. 1, a host bus 11 provides the path for address and data signals to pass between a host computer system (not shown) and the adapter 10. The host bus provides the address and data to which the adapter is connected.

An address decoder 12 is coupled to an address bus 25 and decodes addressed provided on address lines coupled to a host computer system. By use of the address decoder 12 the adapter examiners all addresses on the host bus and determines which addresses are for it, or for the devices attached to it. For addresses intended for the device, the appropriate address lines 25 are activated. For addresses for the adapter's shadow device/head register 40 or command decoder register 30, appropriate command register enable 21 and shadow register enable 22 signal lines are activated.

When the command register 30 is addressed, the command register enable signal line 21 informs the command decoder 30 to examine data on the data bus 100. When the device/head register 40 is addressed, the shadow device/head register enable signal line 22 informs the shadow device/head register 40 to examine data on the data bus 100.

A register access signal line 23 is coupled between the address decoder 12 and a command sequencer 60 and is driven active whenever any register is being accessed on a device. Likewise, a status register enable signal line 24 is also coupled between the address decoder 12 and the command sequencer 60, and indicates that the driver is accessing a status register. The Address but 25 contains address lines which carry decoded addresses, used to select a register in a supported device.

In terms of functionality, the command decoder 30 decodes commands when the command register enable signal line 21 indicates that a command is present on the data bus 100. In accordance with the present invention, an auto polling command detected signal line 31 is coupled between the command decoder 30 and command sequencer 60 and functions to indicate when the unique command that initiates an auto polling sequence has been detected on the data bus 100.

The shadow device/head register 40 suitably comprises a shadow device/head register for each device supported on the ATA channel 80. When the shadow device/head register enables signal line 22 as active, the shadow device/head register reads and stores the contents of the data bus 100 which will necessarily represent the last data written to the device/head register of the device. The shadow device/head register drives a DEV signal line 41 to the command sequencer 60 with the state of DEV. The command sequencer sets the state of DEV by a DEV set signal 63 and indicates when DEV is being set by asserting a DEV control signal line 64 active. A further signal line 65 causes the shadow device/head register to drive its contents onto the data bus 100 when the signal line 65 is asserted active by the command sequencer 60. When the contents of the shadow device head register are driven onto the data bus, the current value of DEV is passed to the command sequencer over DEV state line 41.

A shadow alternate status register 60 contains a "good status" indication if the adapter supports auto polling. This status is driven onto the data bus 100 by a status signal line 61 asserted by the command sequencer 60. The command sequencer is used to control the auto polling sequence as will be described in greater detail further.

In particular, the command sequencer 60 sets data enable buffers 90 and 91 to their normal operating state using signal lines 62 and 67, respectively. Signal line 62 enables the decoded addresses to be passed to the device and interrupts to be passed from the device to the host bus over interrupt line 70. The command sequencer 60 monitors the auto polling command detected signal line 31 and, when active, disables the output of the interrupt line 70 onto the data bus through host buffer 91, using signal line 67. The command sequencer then waits for the next register access to be indicated by register access signal line 23.

If the next register access is not an alternate status read, as indicated by the status register enable signal line 24, the command sequencer 60 returns the process to the beginning, and sets the data enable buffers 90 and 91 to their normal operating state. By using signal line 62, the command sequencer 60 prevents transfer of the device's alternate status response onto the data bus. It substitutes a "good status" signal onto the data bus from the shadow alternate status register 50 controlled by signal line 61.

If the interrupt line 70 is set, the command sequence returns to the beginning and sets the data enable buffers to their normal operating state. The command sequencer 60 sets the address lines in order to select the device/head register of the device. It sets the device select bit using signal line 63 to the opposite value of the DEV signal present on signal line 41. It then disables the data bus from the host bus by issuing the appropriate signal on signal 167. Command sequencer 60 then drives the contents of the shadow device/head register 40 on to the data bus using signal line 64 and control signal 65. The command sequencer 60 then waits a period of time in order to allow the device to recognize the device selection and further monitors the interrupt signal line 70 for an interrupt. If an interrupt is asserted, the process returns to the beginning and the command sequencer sets the data enable buffers to their normal operating state.

An ATA channel 80 is provided and supports the address and data bus to which the device may be connected. This bus provides the signal path for address and data signals to pass between the host, adapter and the device. ATA data buffers 90 read or drive signals from/to the ATA channel, the direction and activation of which is controlled by signal line 62 from the command sequencer 60. Bus/host data buffers 91 read or drive signals from/to the host bus, the direction and activation of which is controlled by signal line 67 from the command sequencer 60.

It will be understood that the foregoing method reduces system overhead by reducing the load on the host processor and greatly simplifies control and operation of overlapped commands. The methods described for the isolation and interpretation of ATA commands by a channel adapter has a wider scope, in that it allows for commands for other adapter purposes to be sent in a similar fashion.

What I claim is:

1. A data communication system comprising:
    a host computer;
    at least one data storage device, configured to communicate with the host computer in accordance with an ATA protocol, the data storage device including a register configured to hold device selection information received from the host computer;
    an ATA compatible cable coupled to the at least one data storage device, the cable including a plurality of address lines;
    an ATA compatible adapter circuit coupled to the cable, and between the cable and the host computer, the adapter circuit including a shadow register, configured to intercept device select information sent by the host computer, the adapter evaluating the contents of the shadow register and forwarding the contents to a selected data storage device.

2. The data communication system according to claim 1, wherein the adapter includes means for periodically polling the selected data storage device in order to receive an interrupt therefrom, the adapter forwarding the interrupt to the host computer such that the data storage device is isolated from the host computer.

3. The data communication system according to claim 2, the adapter further comprising:
    means for recognizing command information issued by the host computer; and
    means for differentiating between command information directed to the data storage device and command information directed to the adapter.

4. The data communication system according to claim 3, further comprising:
    a second data storage drvice coupled to the cable, the second data storage device including a register configured to hold device select information received from the host computer, the device select informaion being a binary value written into a bit position of each register, the binary value taking on a first value to select the first data storage device and a second value to select the second data storage device;
    means, disposed in the adapter, for alternatively selecting the first and second data storage devices; and
    means, disposed in the adapter for periodically polling each alternatively selected data storage device in order to receive an interrupt therefrom, the adapter forwarding the interrupt to the host computer such that each data storage device is polled without host computer intervention.

5. The data communication system according to claim 4, wherein the adapter includes means for asserting the presence of a shadow register to the host computer.

6. The data communication system according to claim 5, wherein the adapter further includes means for disabling intervention of device select information sent by the host computer by the shadow register upon receipt of an interrupt from a polled data storage device.

* * * * *